Aug. 30, 1960  A. M. STEELMAN  2,950,542
EDUCATIONAL AID FOR TEACHING ARITHMETIC
Filed July 9, 1959
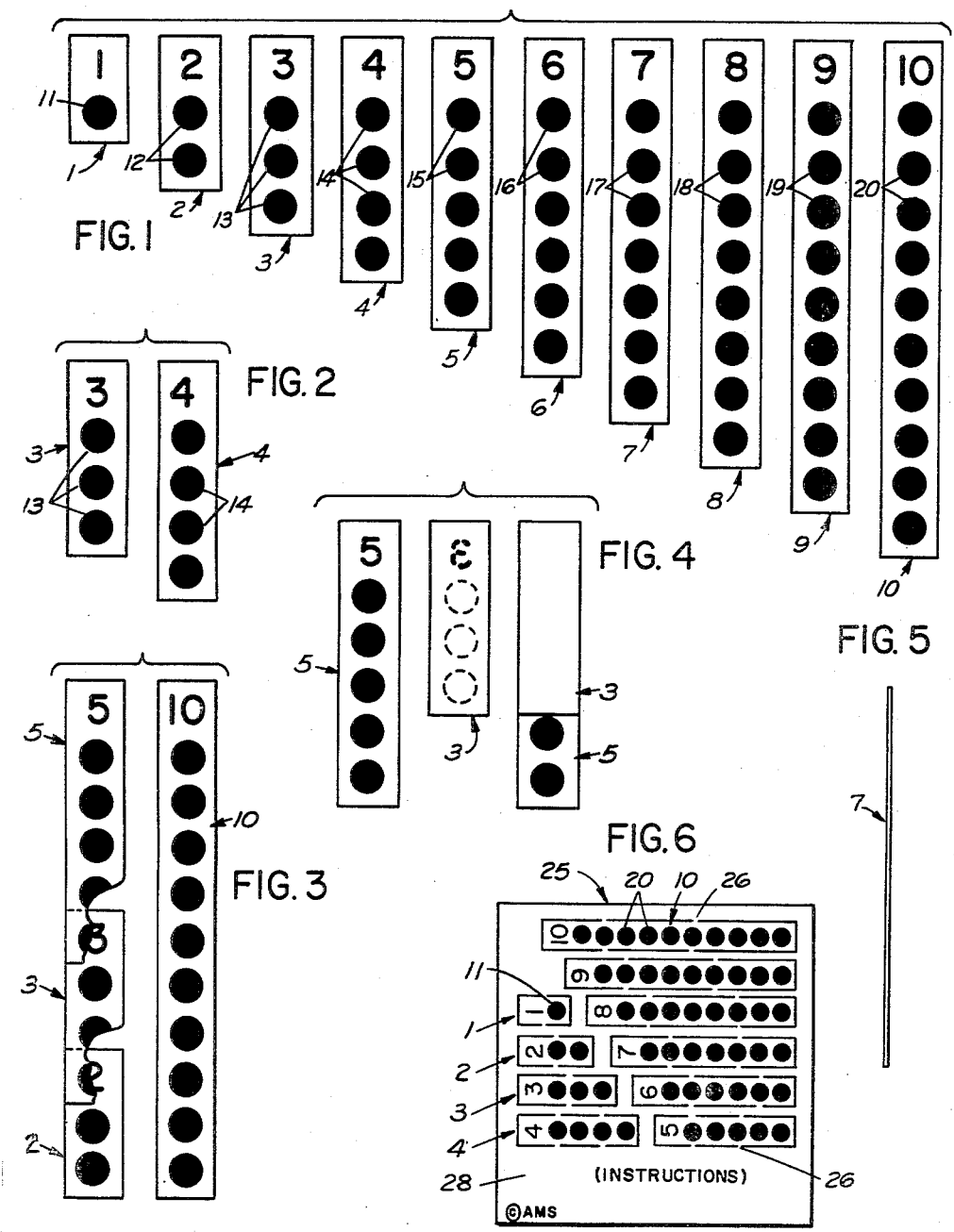
ALICE M. STEELMAN INVENTOR.
BY
Roger C. Johnson
ATTORNEY United States Patent Office 2,950,542
Patented Aug. 30, 1960

2,950,542
EDUCATIONAL AID FOR TEACHING ARITHMETIC
Alice M. Steelman, 906 39th St. Court, Moline, Ill.
Filed July 9, 1959, Ser. No. 826,008
1 Claim. (Cl. 35—31)

This invention relates generally to teaching aids and is more particularly concerned with visual aids for teaching arithmetic to young pupils.

The object and general nature of this invention is the provision of a set of strips, each having at one end a numeral and below the numeral a series of spots, the number of which corresponds to the numeral on the strip. A further feature of this invention is the provision of a set of strips of the character just referred to, wherein both the numeral and the spots, the number of which correspond to the numeral on the strip, are visible to the pupil, whereby the latter readily gains with relative rapidity a fuller appreciation of the real meaning of numbers.

An important feature of this invention is the provision of a set of number strips that are so constructed and arranged as to be readily held and handled by the pupil. Specifically, the set of strips of this invention are relatively thin, so that the child may readily grasp and manipulate one or more of them. Being thus thin and flat, a set of strips of this invention occupies little space and where considered desirable each pupil may have his own set since it takes up only a small space in his school desk.

These and other objects and advantages of my invention will be apparent to those skilled in the art after a consideration of the following detailed description of the preferred form of my invention, taken in conjunction with the accompanying drawings, in which:

Fig. 1 is a view of the complete set of numeral strips of this invention.

Fig. 2 illustrates how two or more strips may be used to illustrate addition while maintaining both the numerals and the corresponding number of spots visible.

Fig. 3 illustrates how column addition may be presented.

Fig. 4 illustrates how subtraction may be presented.

Fig. 5 is an edge view of one of the strips.

Fig. 6 is a plan or face view of a card which is printed and scored, forming an integral part containing all of the strips and from which the several strips may readily be removed reaches the ultimate user, that is, the teacher and/or pupil.

According to this invention I provide a set of ten strips indicated at 1, 2, etc., through 10. Strip 1 carries at one end the numeral 1 and below the numeral is one spot. Considering that the numeral 1 occupies one unit of length of the strip 1 and the one spot, indicated at 11, occupies a second unit of length, the strip 1 is two units long, or in other words, the length is equal in units to the numeral 1 plus one. All of the other strips are of like construction. That is, the strip 2 has at one end the numeral 2 and two spots indicated at 12, and has a length that is equal in units to two plus one, or three. The strip 3 has at one end the numeral 3 and three spots indicated at 13, and is three plus one, or four, units in length. The strip 4 bears the numeral 4 at one end and has four spots 14, and is four plus one, or five, units in length. The other strips 5, 6, 7, 8, 9, and 10 are of corresponding construction, each bearing the appropriate numeral and the number of spots indicated by that numeral, and in length each strip is equal to the numeral plus one.

The various strips thus carry numbers and the correct number of spots, and both the numeral and the corresponding number of spots are visible to the pupil at the same time so that he readily acquires a concept of the meaning of the numeral on each strip. Thus, according to this invention, the intimate and practically instantaneous association of the numeral with the number of things, such as spots, represented by the numeral is assured by the fact that the pupil may see both the numeral and the number of spots which the numeral represents.

Fig. 2 indicates the manner in which the facts of addition may be presented by the teacher to the class. Holding strips 3 and 4, for example, alongside one another, each member of the class may see the numerals "3" and "4" and at the same time, also, the three spots and the four spots, and by counting the spots the pupils learn that the sum of 3 and 4, which are continually visible to them, is seven. Further, after noticing how the teacher presents the strips, each pupil with his own set of strips may assemble various ones and, observing the numerals or figure symbols and counting the spots, readily learn addition by virtue of his own efforts, a most effective way of learning. Since the numerals "3" and "4" are constantly in view the fact that the sum of these numbers equals seven is impressed on the mind of the child for he also sees that there are a total of seven spots. Thus, the pupil begins to realize that, not merely that three spots and four spots equal seven spots, but also that the sum of "3" and "4" also equals seven. Further, since the strips are flat and relatively thin, and easily manipulated, the pupil with his own set of strips is able to touch the spots as he counts them. Thus, while the numerals are constantly before him, the pupil by touching the spots aids his learning the meaning of the numeral by virtue of his own perception or consciousness of muscular movement in so counting while the visual perception of the number is before him.

Fig. 3 illustrates another manner in which the strips of this invention are adapted to present the arithmetical facts of addition, such as column addition, for example. To present the addition of the numbers 5, 3 and 2, the strips are disposed, not alongside one another, as in Fig. 2, but are disposed in what may be termed columnar relation, one above the other or end to end so as to present a continuous column. To do this it is necessary, as will be clear from the left portion of Fig. 3, to dispose the "3" of the strip 3 underneath the lower end of the bottom or lower spot of the strip 5; that is, the "3" of strip 3 lies directly underneath the lowermost spot of strip 5. Likewise, the numeral "2" of strip 2 lies directly underneath the lowermost spot of the strip 3. Thus when arranged in this way, as shown in Fig. 3, left hand portion, there is a continuous column of uniformly spaced apart spots, the number of which is the total or sum of 5 plus 3 plus 2, which the child may determine by counting them. This can be checked by the child readily. The child may select strip 10, having ten spots and bearing the numeral "10," and lay the strip alongside the "5," "2" and "3" strips, and he will then note that the "10" strip bears the same number of spots as the total number of spots of the "5," "2" and "3" strips, and thus he perceives that the sum of 5, 2 and 3 equals 10, which is thus presented by not only the figure symbol 10 but also by the number of spots on the "10" strip. Further, although in this assembly the numerals 3 and 2 are not continuously visible, the child knows they are there and he may readily see them merely by lifting up the lower end of the "5" strip and the lower end of the "3" strip.

With his own set of strips, each child may thus assemble various combinations of two, three or four number strips and find the sum of the corresponding numbers by placing a longer strip in side by side coincidence, as illustrated in Fig. 3. If, for example, the sum of the assembled smaller strips exceeds ten, the child may still learn the sum, and, further, the sum of another similar combination, by disposing two assembled strips alongside the other assembly. For example, if the first columnar assembly consisted of the "3," "4" and "5" strips, the child may assemble the "4" and "8" strips alongside, whereby he will learn that the sum of 3, 4 and 5 is the same as the sum of 4 and 8. These advantages are present because both the numerals and the corresponding spots are on the same faces of the strips, respectively.

The facts of subtraction may be demonstrated in the manner illustrated in Fig. 4. In the example shown in this figure, to present the subtraction of three from five, strips "3" and "5" are selected. The "3" strip is turned over so that the blank face is up, and then the "3" strip is laid over the "5" strip, with the numeral sections above one another. As shown in the right hand portion of Fig. 4, all but two of the spots on the "5" strip are covered, leaving two spots uncovered and representing the remainder. Each child, with his own set, may thus manipulate the strips and gain the proper perception as to how the smaller number may be taken away from the larger number, leaving a remainder. While in this operation both numerals "5" and "3" are momentarily out of sight, if the child desires to refresh his memory as to the number to be subtracted and the number from which it is to be taken, he may do so merely by lifting up one end of upper strip. Further, in this example, the difference is represented by the two spots visible, the child may readily find the strip with two spots and, laying it alongside the two visible spots of the "3" and "5" cards readily associate the swo spots with the number "2" that is visible on the matching card. Thus, the child may readily make use of both the number of spots indicating the remainder and also the corresponding numeral or figure symbol in learning arithmetic.

In the commercial exploitation of my invention I contemplate originally supplying the strips as an integral part of a card of suitably heavy stock. The card, indicated at 25, is processed in a conventional printing press and the latter is also provided with means to score the card 25 along the edges of the strips, leaving a sufficient number of areas not scored, as shown at 26, so that while the strips may readily be removed from the card when the latter reaches the ultimate user, nevertheless the whole assembly is easily handled, shipped, stored and displayed for inspection and sale as a unit. Space is provided at 28 for instructions, directions and the like.

While I have shown and described above the preferred structure in which the principles of my invention have been incorporated, it is to be understood that my invention is not to be limited to the particular details shown and described above, but that, in fact, widely different means may be employed in the practice of the broader aspects of my invention.

Having described my invention, what I claim and desire to secure by Letters Patent is:

A visual aid for teaching addition, subtraction, and other simple arithmetical facts, comprising a set of ten thin flat strips of progressively varying lengths, each strip being blank on one face and bearing indicia on the other face, said indicia comprising a numeral, such as 1, 2, etc., up to 10, on one end of each strip and a number of spots spaced uniformly along the remainder of the strip, longitudinally thereof, the number of spots on each strip being the same as the numeral on the strip, the numeral on each strip occupying approximately one unit of length of the strip and each of said spots occupying approximately another unit of length, so that the total length of each strip is equal in said units to the numeral plus one, the spacing of the spot or spots and the numeral on each strip being such that when two or more of the smaller number strips are arranged in end to end relation with the lower end of one strip overlying the numeral on the next lower strip the spots on both strips are spaced apart uniformly so that a larger number strip which includes the number of spots that constitutes the sum of the spots of the two or more smaller number strips, may be disposed alongside the end to end related strips and the spots of the larger number strip will be in lateral alignment with the spots on the smaller number strips.

References Cited in the file of this patent

UNITED STATES PATENTS

| 322,754 | Schueller | July 21, 1885 |

FOREIGN PATENTS

| 265,451 | Germany | Oct. 8, 1913 |
| 529,461 | Great Britain | Nov. 21, 1940 |
| 762,586 | Great Britain | Nov. 28, 1956 |